US011554522B2

(12) United States Patent
Satzger

(10) Patent No.: US 11,554,522 B2
(45) Date of Patent: Jan. 17, 2023

(54) MOLD HAVING A SPRUE CUTTER

(71) Applicant: BBG GmbH & Co. KG, Mindelheim Bayern (DE)

(72) Inventor: Bernhard Satzger, Mindelheim Bayern (DE)

(73) Assignee: BBG GMBH & CO. KG, Bayern (DE)

( * ) Notice: Subject to any disclaimer, the term of this patent is extended or adjusted under 35 U.S.C. 154(b) by 18 days.

(21) Appl. No.: 17/251,626

(22) PCT Filed: May 16, 2019

(86) PCT No.: PCT/EP2019/062711

§ 371 (c)(1),
(2) Date: Dec. 11, 2020

(87) PCT Pub. No.: WO2019/238354

PCT Pub. Date: Dec. 19, 2019

(65) Prior Publication Data

US 2021/0252751 A1 Aug. 19, 2021

(30) Foreign Application Priority Data

Jun. 13, 2018 (DE) ......................... 102018114187.4

(51) Int. Cl.
*B29C 44/58* (2006.01)
*B29C 44/12* (2006.01)
*B29L 31/30* (2006.01)

(52) U.S. Cl.
CPC .......... *B29C 44/58* (2013.01); *B29C 44/1271* (2013.01); *B29L 2031/3052* (2013.01)

(58) Field of Classification Search
CPC .. B29C 44/58; B29C 44/18; B29L 2031/3052
See application file for complete search history.

(56) References Cited

U.S. PATENT DOCUMENTS 4,767,312 A * 8/1988 Huttner ............... B29C 33/0055 249/176
6,461,704 B1 * 10/2002 Matsco ...................... B60J 1/08 428/192

(Continued)

FOREIGN PATENT DOCUMENTS

DE 10059958 A1 * 3/2002 ............. B29C 45/38
DE 102008030823 A1 * 1/2010 ......... B29C 45/1615
DE 102009012287 A1 * 9/2010 ......... B29C 33/0061

*Primary Examiner* — Jacob T Minskey
*Assistant Examiner* — Debjani Roy
(74) *Attorney, Agent, or Firm* — McDonnell Boehnen Hulbert & Berghoff LLP

(57) ABSTRACT

The invention relates to a mold (200) for producing a foam cladding (120) made of plastic on a planar component (100) or for producing a foamed plastic part (120), comprising a mixing head (300) for producing liquid plastic from at least two components, at least one first cavity (240) for receiving the plastic in order to form the foam cladding (120) or to produce the foamed plastic part (120), a sprue channel (210) for connecting the mixing head (300) to the at least one first cavity (240), and a further cavity (220), which is formed at the transition of the sprue channel (210) to the first cavity (240) and widens the sprue channel (210). For automated cutting of a tag-like sprue, which would otherwise adhere to the foam cladding, the invention provides that a sprue cutter (400) having at least one slide (410) is movably mounted on the mold (200), which slide can be moved by means of at least one actuating cylinder (450) in the direction of the sprue channel (210) toward the first cavity (240) and, in an end position of the movement of the slide, closes off the first cavity (240) from the sprue channel (210) and/or from the further cavity (220) by means of at least one edge (414) and/or contour (412).

12 Claims, 6 Drawing Sheets

(56) References Cited

U.S. PATENT DOCUMENTS

Figure 1:
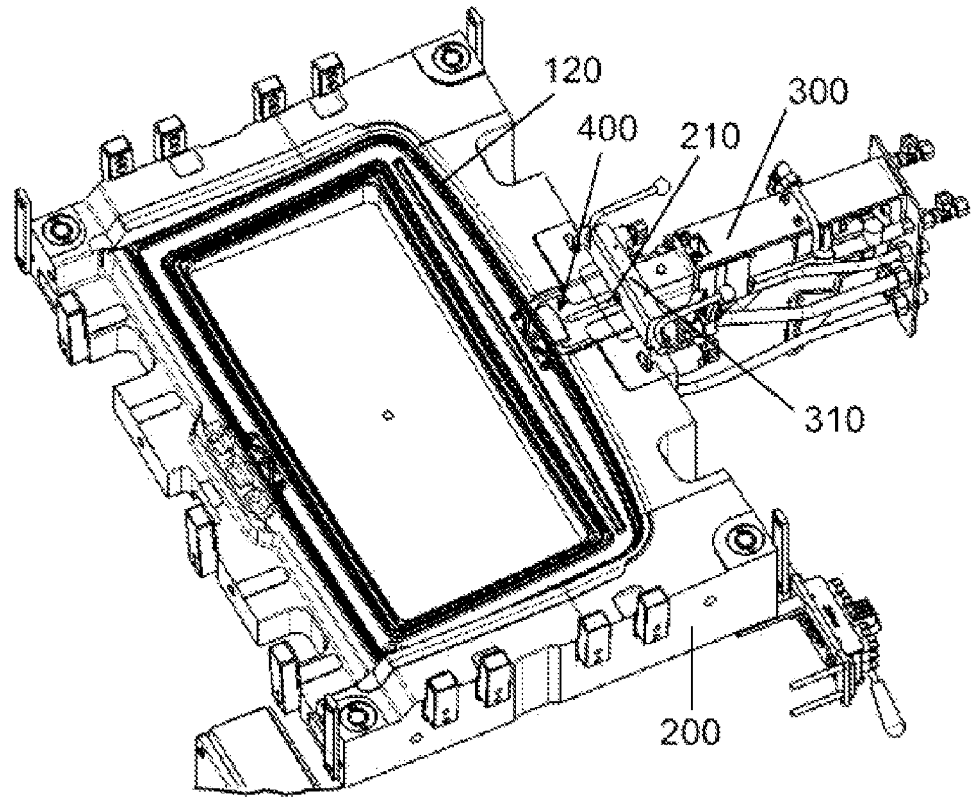

| | | | | |
|---|---|---|---|---|
| 9,266,269 | B2 * | 2/2016 | Yamaguchi | B29C 45/18 |
| 2010/0225025 | A1 * | 9/2010 | Striegel | B29C 45/281<br>264/328.8 |
| 2013/0186654 | A1 * | 7/2013 | Dunster | A62C 3/07<br>169/62 |
| 2017/0320249 | A1 * | 11/2017 | Wieder | B29C 45/26 |

* cited by examiner

MOLD HAVING A SPRUE CUTTER

CROSS REFERENCE TO RELATED APPLICATION

This application is a U.S. national phase of International Application No. PCT/EP2019/062711, filed May 16, 2019, which claims priority to German Patent Application No. 10 2018 114 187.4, filed Jun. 13, 2018, both of which are incorporated by reference herein in their entirety.

The invention relates to a mold according to the preamble of claim 1.

This type of mold has long been known from the production of polyurethane (PU) foam-clad glass lids for sliding roofs of vehicles. Until now, the tag-like sprue remaining at the transition from the sprue channel to the cavity for the foam-cladding after the polyurethane has cured has had to be neatly separated from the foam cladding by a worker with a sharp knife. Apart from the additional effort, there is also the risk of irreparably damaging the foam cladding with the knife, resulting in the entire foam-clad glass cover having to then be treated as scrap.

A tool for producing a plastic part is known from CN 206386338 U in which a scraper is mounted on the tool so as to be movable by means of a hydraulic cylinder. A tool for producing a plastic part is known from JP 60089322 in which a slide that can be moved transverse to the sprue and extends the sprue channel with a bore closes off the sprue channel after a mold-forming cavity has been filled.

It is the object of the invention to provide a mold by means of which a planar component with a foam cladding can be removed from the mold in finished condition without reworking.

This object is achieved by a mold with the features of claim 1. Advantageous embodiments of the invention are indicated in the subclaims.

According to the invention, a mold for producing a foam cladding on a plate-shaped component or for producing a foam-clad plastic part has a mixing head for producing liquid plastic made of at least two components. The mold has at least one first cavity for receiving the plastic for forming the foam cladding or the plastic component. A sprue channel is used to connect the mixing head to the at least one first cavity. Another cavity that widens the sprue channel is formed at the transition from the sprue channel to the first cavity. According to the invention, a sprue cutter, which is also referred to as a sprue trimmer, is movably mounted on the mold with at least one slide, which can be moved by means of at least one actuating cylinder in the direction of the sprue channel toward the first cavity. In an end position of its displacement, the slide closes off the first cavity with at least one edge and/or contour relative to the sprue channel and/or relative to the further cavity.

It is especially advantageous if the actuating cylinder is hydraulically connected by means of a branch line to a main line of a cleaning cylinder that is used to actuate a cleaning piston for cleaning the mixing head. As a result, the slide does not require any further control; instead, this is achieved by the hydraulic system of the mold simultaneously with or by means of an additional valve so as to be slightly offset in time before the cleaning stroke, which needs to be triggered after each foaming operation anyway.

The control is advantageously carried out in such a way that the cleaning piston and the actuating cylinder of the slide can only be actuated when the first cavity has been completely filled—that is, after the foam cladding has been completely produced. This is preferably done as a function of a defined quantity of the plastic generated in the mixing head and conveyed into the first cavity.

According to an advantageous embodiment, a provision is made that the slide is connected to the actuating cylinder by means of a guide element that is displaceably mounted in a vertical guide groove.

A mold is especially advantageous in which the slide can be moved vertically by means of at least one further actuating cylinder using the guide groove that is arranged on the guide element. This enables the slide to be raised in a simple manner into a cleaning position for a cleaning operation and then lowered back into its use position.

When the slide is in its end position, a gap for receiving superfluous plastic material is unblocked between the slide and the mixing head in the vicinity of the sprue channel. This gap is used for the orderly removal of excess liquid plastic material still in the outlet pipe of the mixing head during the subsequent cleaning stroke of the mixing head. The excess plastic material forms a thin, tag-like structure in the gap provided for this purpose, which is neatly separated from the plastic frame or plastic component by the edge of the sprue cutter.

In a preferred embodiment, the slide has, on its front edge facing toward the first cavity, a contour that is adapted to the contour of the foam cladding. This contour delimits and shapes the foam cladding in accordance with the contour intended for it.

The slide is advantageously provided with at least one seal which at least partially surrounds the sprue channel and the further cavity at a distance. The seal prevents the excess plastic material from running too wide and supports its orderly return into the gap.

Figure 2:
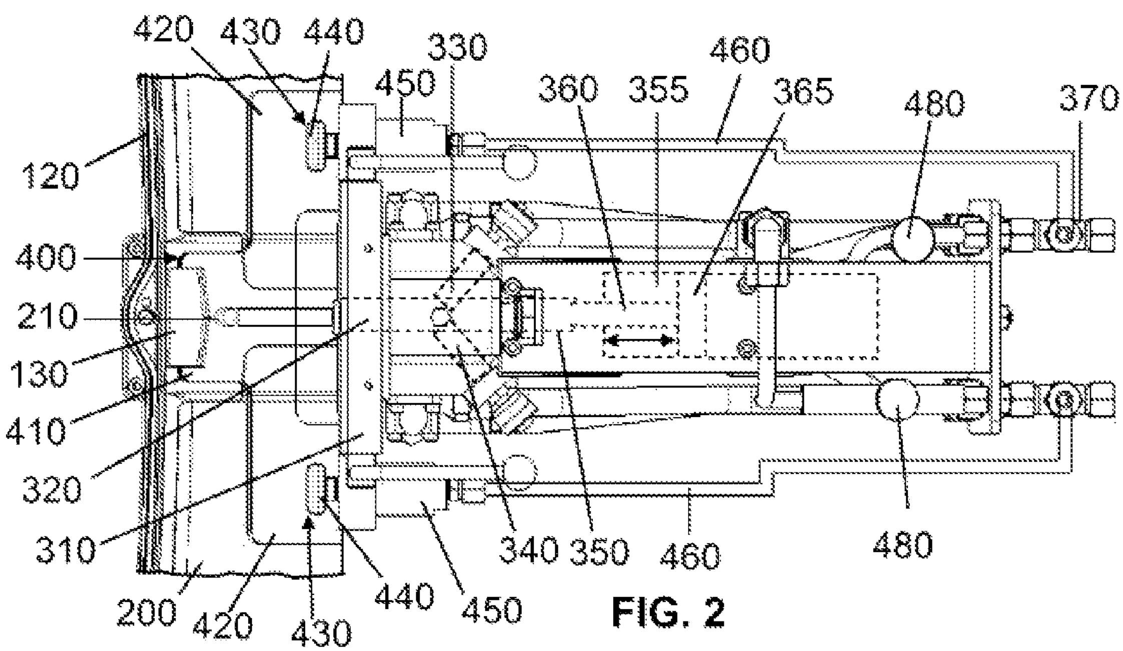
Figure 3:
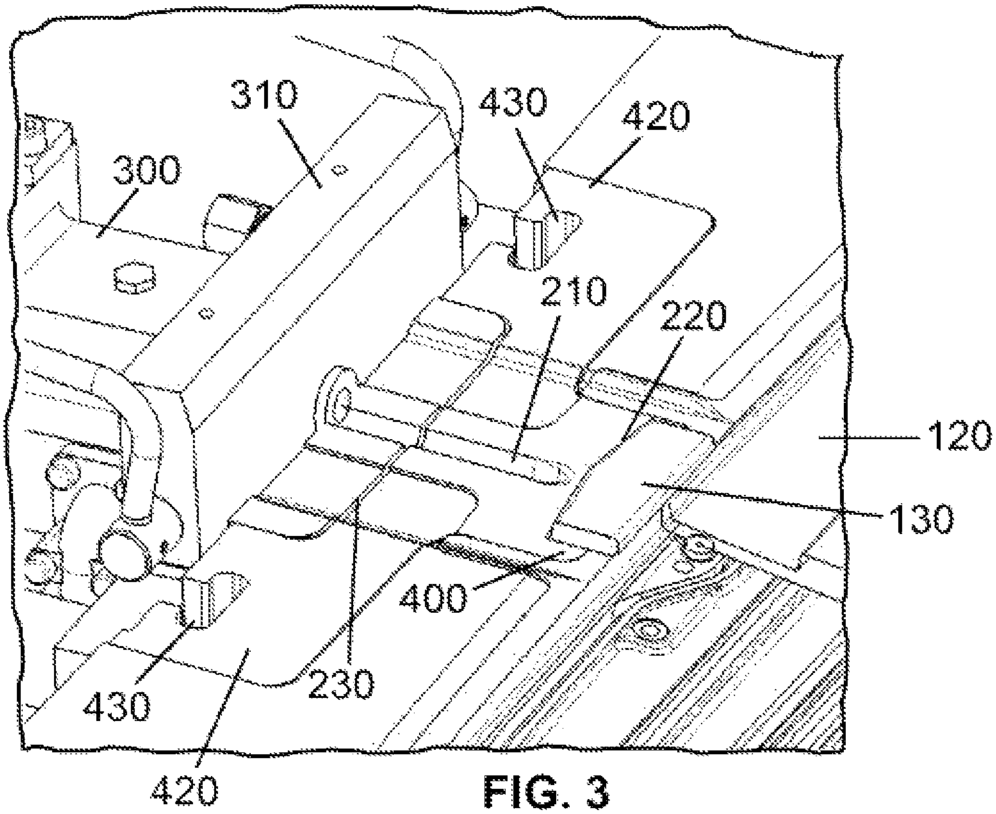
Figure 4:
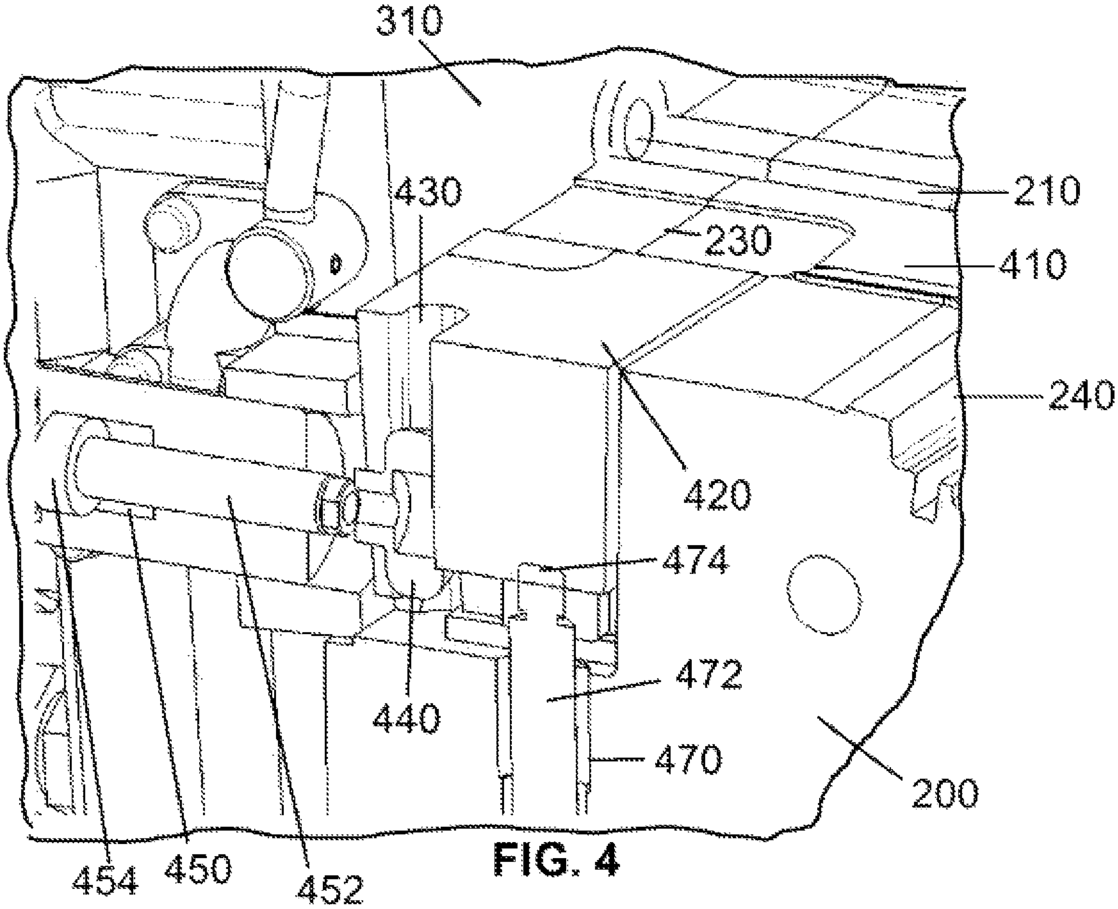
Figure 5:
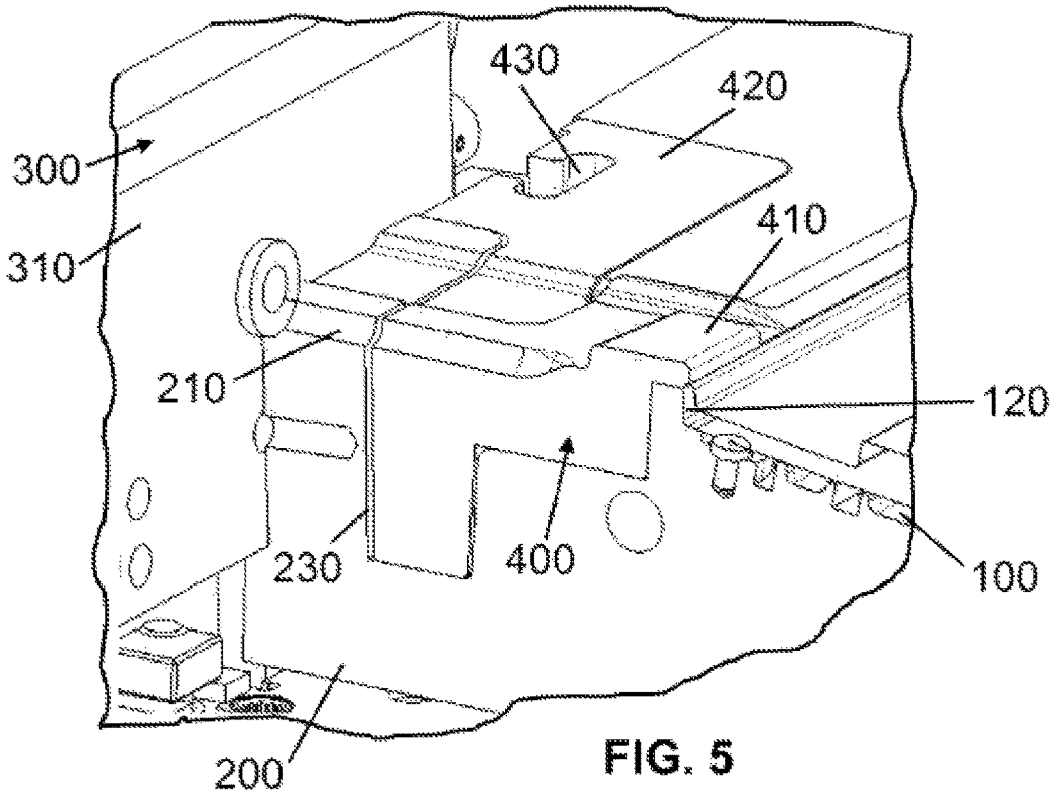
Figure 6:
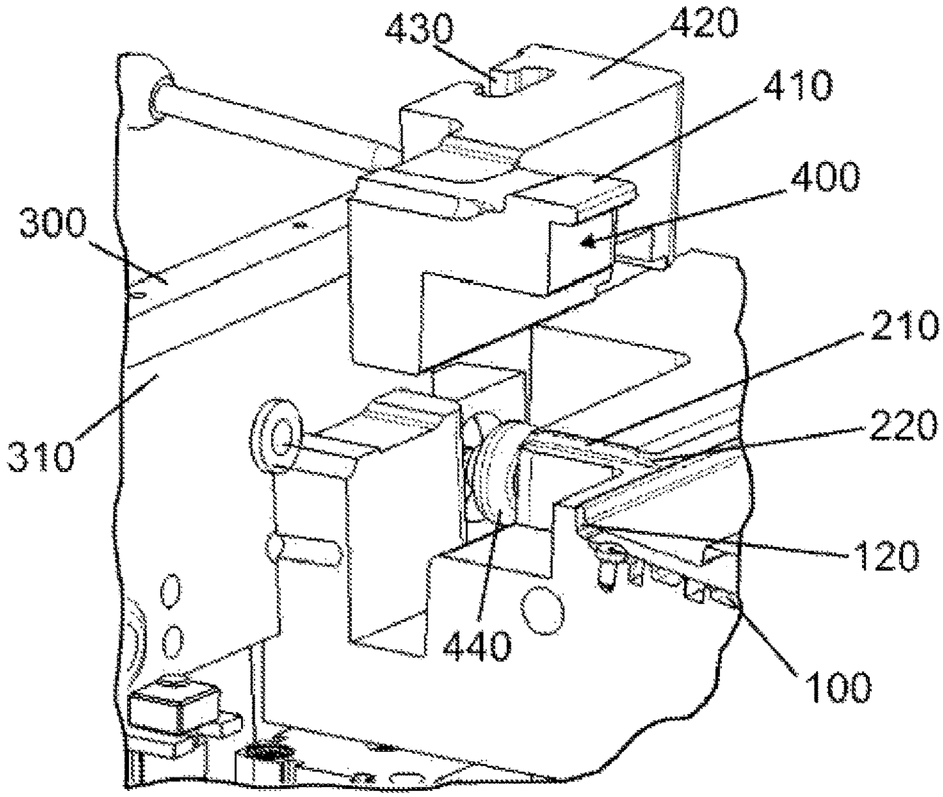
Figure 7:
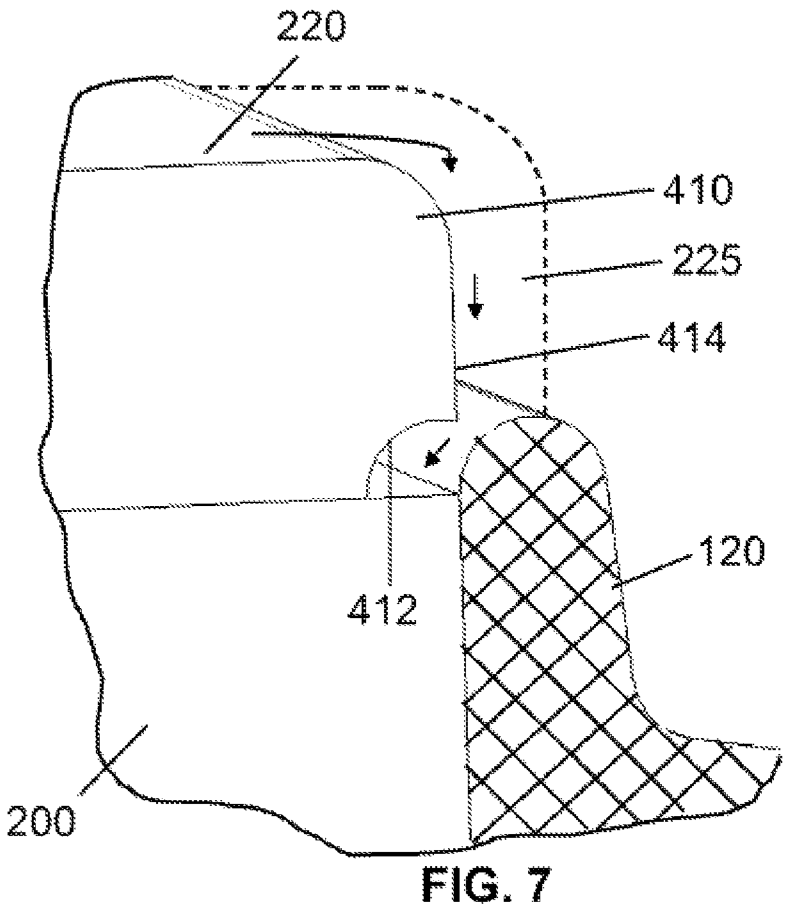
Figure 8:
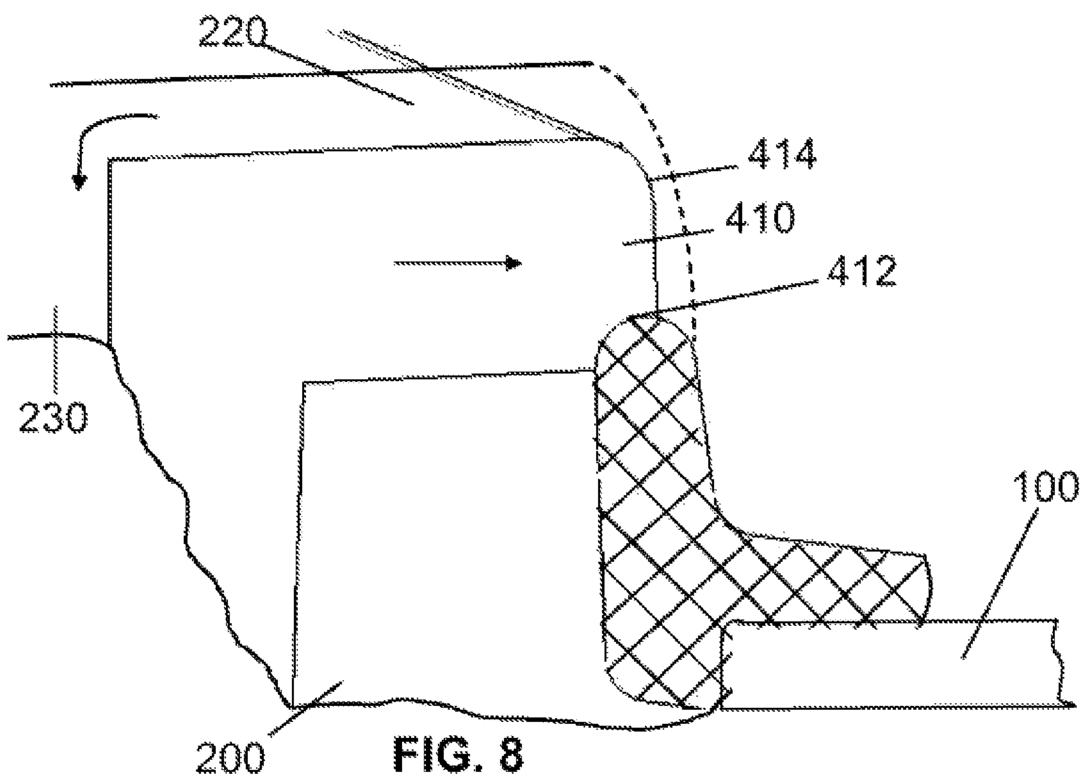
Figure 9:
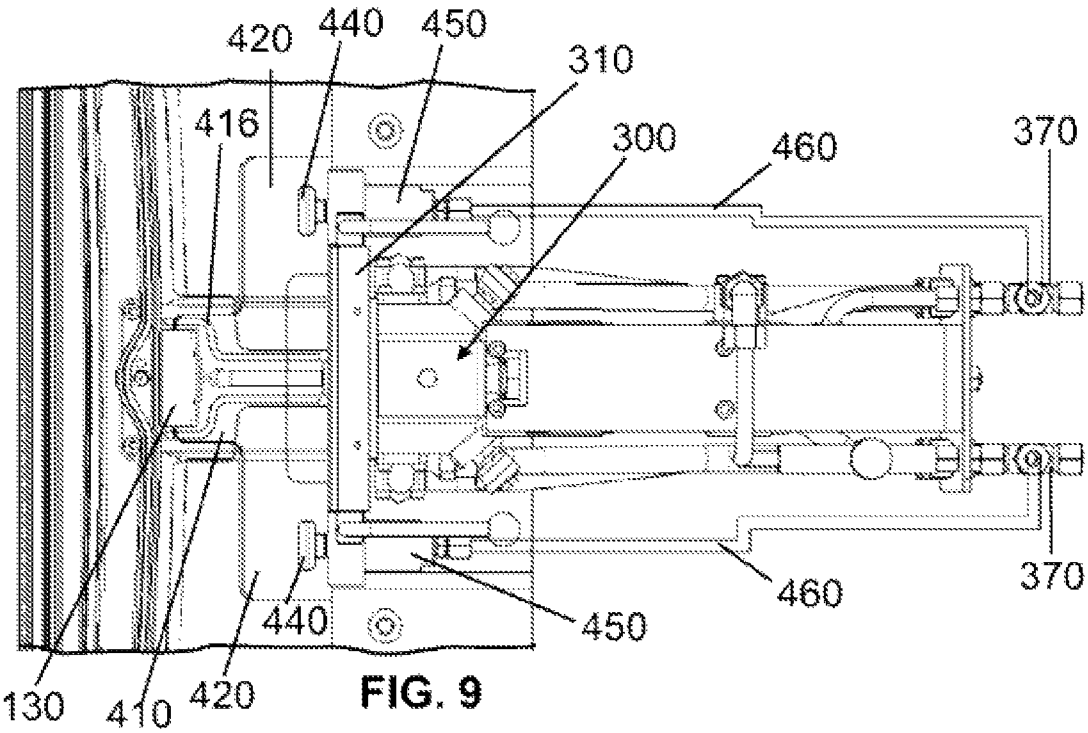
Figure 10:
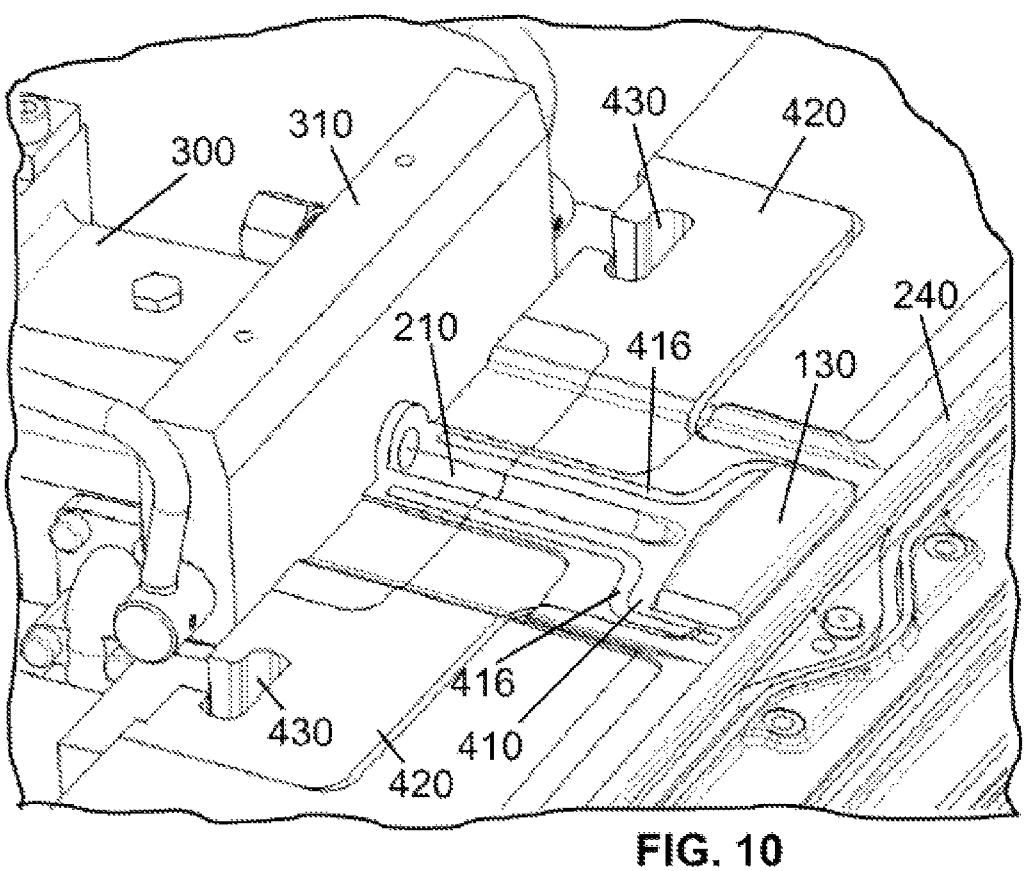
Figure 11:
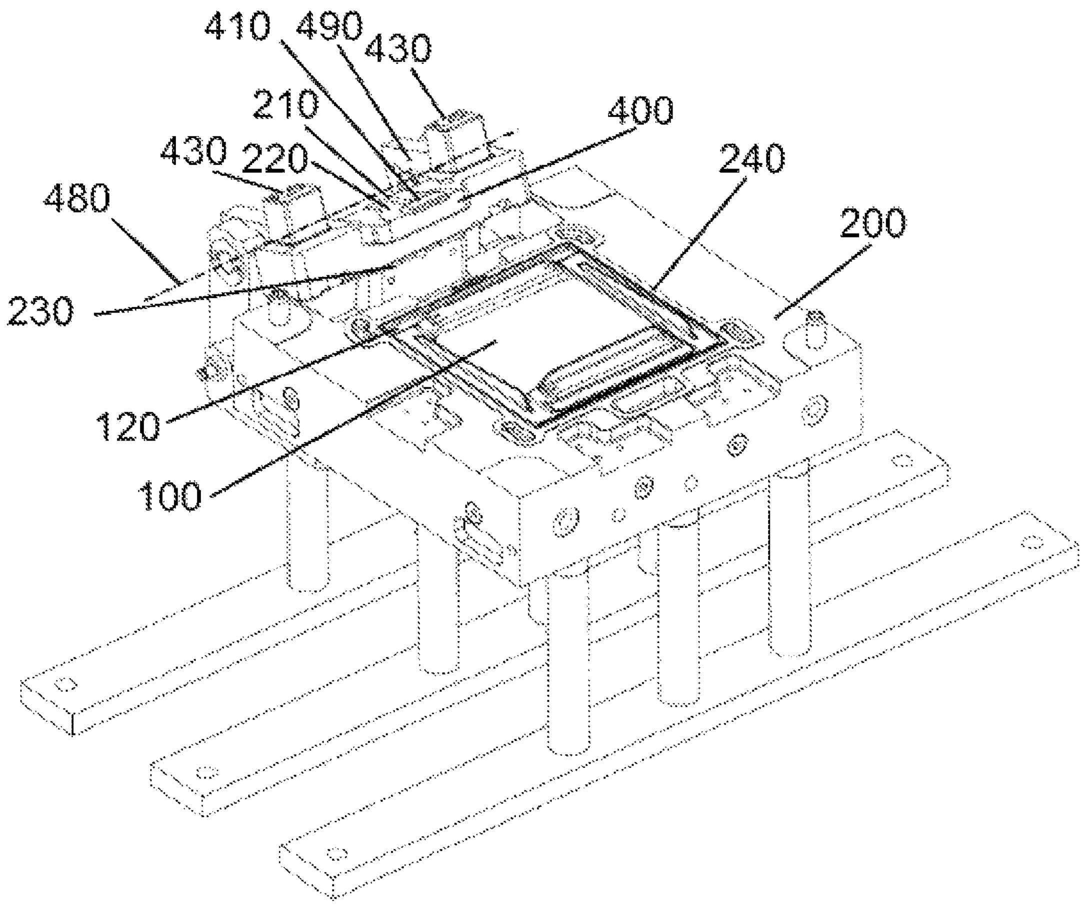

An exemplary embodiment of a tool according to the invention is explained in greater detail below with reference to the drawings. In the drawing:

FIG. 1 shows an overall perspective view of a lower mold according to the invention;

FIG. 2 shows a plan view of the front part of the tool with the mixing head and the sprue cutter and with its slide in the home position, which allows the injection of plastic material, FIG. 3 shows a perspective, detailed view of the front tool area with the sprue cutter and with the slide in the position in which the introduction of plastic material has been completed and the sprue is trimmed off, FIG. 4 shows a perspective, sectional view through the slide of the sprue cutter in the area of its actuating cylinder in order to elucidate its vertical guidance, FIG. 5 shows a perspective, sectional view through the slide of the sprue cutter in the area of the sprue channel and with the slide in the position in which the introduction of plastic material has been completed and the sprue is trimmed off, FIG. 6 shows a perspective, sectional view through the slide, which has been raised into its cleaning position in the area of the sprue channel, FIG. 7 shows an enlarged, perspective sectional view through the front area of the slide in the filling position for the first cavity, FIG. 8 shows an enlarged, perspective sectional view through the front area of the slide in the position in which it closes off and separates the first cavity from the sprue, FIG. 9 shows a variant of FIG. 2 with an additional seal on the slide;

FIG. 10 shows a variant of FIG. 3 with the additional seal on the slide; and FIG. 11 shows a variant of a lower mold with a sprue cutter swivelably hinged thereto in its swiveled cleaning position.

In FIG. 1, a mold 200 is shown in an overall view. The mold 200 consists of the illustrated lower mold and an upper mold (not shown) that can be lowered onto the former from above. A plate-shaped component 100 (not shown in FIG. 1; see FIG. 8), which is instantiated in the present example by a glass cover 100 for a sliding roof of a vehicle, is placed into the lower mold 200. The glass cover 100 is enclosed in the mold 200 at its edge by a foam cladding 120 made of plastic.

A mixing head 300, which is provided with a plate 310 adjoining the mold 200 and into which a mixing channel 320 discharges, is used to introduce the liquid plastic. The mixing channel 320 formed in the mixing head 300 merges into a sprue channel 210 of the mold 200 when it emerges on the front side of the plate 310.

A front part of the sprue channel 210 pointing toward the plate-shaped component 100 is formed in a slide 410 (shown in the figures after FIG. 1), which is part of a sprue cutter 400.

As can be seen in FIG. 2, a first injection channel 330 for a first component and a second injection channel 340 for a second component open into the mixing channel 320. The plastic produced in the mixing channel 320 is preferably polyurethane (PU). The two mixed components are introduced in the still-liquid state through the mixing channel 320 and the sprue channel 210 into a first cavity 240 on the mold 200, which is a negative representation of the contour of the foam cladding 120 for the glass cover 100. The first cavity 240 is formed between the lower mold 200 and the upper mold (not shown) when these have been brought together into tight abutment by a molding machine.

At the transition between the sprue channel 210 and the first cavity 240, a second cavity 220 is formed for the sprue 130, which, as a widened area, introduces the liquid plastic material flowing from the sprue channel 210 to the first cavity 240 in a wider front into the first cavity 240. In conventional molds, the sprue 130 remains adhering to the foam cladding 120 as a tag-shaped attachment after the foam cladding 120 has been completed—i.e., after the plastic material has cured—and must be separated manually therefrom.

The slide 410 consists of a central part that reaches into the second cavity 220 and two holders 420 that are arranged to the side of the central part, the front edges of which, when viewed from the plate 310, only extend up to about half the distance between the plate 310 and the foam cladding 120.

A T-shaped undercut vertical guide groove 430 into which a respective guide element 440 that is embodied as a mushroom-shaped T-nut engages is formed in each of the two holders 420. As can be seen from FIG. 4 in particular, the guide element 440, in turn, is connected via a guide rod 452 to a piston 454. The piston 454 is displaceably mounted in a horizontal actuating cylinder 450. The horizontal actuating cylinder 450 is connected for this purpose to a hydraulic branch line 460 (FIG. 2) that branches off from a hydraulic main line 370.

The hydraulic main line 370 opens into a cleaning cylinder 355 which is arranged in the mixing head 300 and in which a cleaning piston 365 is mounted in a hydraulically displaceable manner. The cleaning piston 365 is connected to a cleaning plunger 360 that protrudes into a cleaning channel 350, which connects to the mixing channel 320 as a rear extension of the latter and closes off the mixing channel 320 behind the two injection channels 330 and 340 toward the rear with its end face. The cleaning piston 365 and the cleaning plunger 360 can be displaced from the operating position indicated in FIG. 2, in which the components for producing the plastic material are injected or sprayed into the mixing channel 320 from the two injection channels 330 and 340, starting from the position shown in FIG. 2 to the left into a cleaning position, in which the end face of the cleaning plunger 360 is pushed by the cleaning piston 365 to the end face of the plate 310. In this case, the mixing channel 310 is completely cleaned of plastic material by the cleaning plunger 360 that is pushed forward out of the mixing channel.

By virtue of the direct coupling of the hydraulic branch line 460 to the main line 370, when the cleaning piston 365 is activated, the pistons 454 in the actuating cylinders 450 are also pushed forward (i.e., to the left in FIG. 2). As a result, the slide 410 of the sprue cutter 400 is also displaced to the left.

While the slide 410 is in the operating position shown in FIG. 7, [and] while the liquid plastic for producing the foam cladding 120 flows through the cavity 220 and the vertical feed channel 225 into the cavity 240 in order to fill it completely, the slide 410 closes off the feed channel 225 with its front edge 414 when in the position shown in FIG. 8. The contour 412 of the slide 410, which has a cross section in the shape of a quarter circle, rests exactly against the round end contour of the upwardly oriented, rounded rib of the foam cladding 120 and aids in the shaping thereof during the hardening of the plastic material.

Through the inclusion of a hydraulic delay element 380 in the main line 470—e.g., a valve or a throttle downstream from the branch line 460—or through impingement by means of a separate valve and a separate hydraulic line, the actuating cylinder 450 is especially advantageously acted upon somewhat before the cleaning piston 365, so that the connection to the cavity 240 is interrupted even before the residual plastic material is pushed out of the mixing channel 320 through the sprue cutter 400 and a harmful increase in pressure can no longer occur in the cavity 240.

Since the front edge 414 of the slide 410 closes off the entire feed channel 225 when in the closed position shown in FIG. 8, the excess liquid plastic is forced to flow backward out of the cavity 220 for the sprue 130 into the gap 230, which the slide 410, in its movement forward from the position shown in FIG. 7 into the position shown in FIG. 8, unblocks on its rear side.

In a preferred variant, as can be seen clearly from FIGS. 4 and 6, the slide 410 can be moved not only horizontally—i.e., parallel to the sprue channel 210—but also vertically. Further actuating cylinders 470 are arranged for this purpose below the holder 420 of the slide 410. The pistons 472 that can be displaced in the actuating cylinders 470 are in driving engagement with the holders 420 via an articulation 474. When the slide 410 moves vertically from the situation shown in FIG. 4 into the position shown in FIG. 6, the holders 420 are guided by the vertical guide grooves 430 along the guide elements 440. The raised position of the slide 410 illustrated in FIG. 6 serves the purpose of thoroughly cleaning the mold 200, during which cleaning plastic material can also be removed that has flowed back into the gap 230.

In the embodiment shown in FIGS. 9 and 10, in supplementation to FIGS. 2 and 3, an additional seal 416 is arranged on the upper side of the slide 410 that extends forward on both sides of the sprue channel 210, expands in the area of the second cavity 220, more particularly of the sprue 130, and encloses it on both sides. This seal 416 effectively prevents the liquid plastic from flowing off to the sides in the direction of the holder 420.

FIG. 11 shows an alternative of a mold 200 in which, after the linear advancement of the slide 410 into its cutting or trimming position, the sprue cutter 400 is mounted so as to swivel about a pivot axis 480 relative to the mold 200 through fixation to a swiveling bracket 490. In FIG. 11, the foam-cladding of the plate-shaped component 100 results in a foam cladding 120. The slide 410 has sealed off the cavity 240 from the cavity 220 and, while not shown in FIG. 11, the cleaning piston 365 has cleaned the mixing channel 320 by pushing out the remaining plastic material. The excess plastic material is hardened in the vertical gap 230 to form a tag-shaped structure. When the sprue cutter 400 is swiveled upward as shown in FIG. 11, this gap 230 becomes more accessible for cleaning and for the introduction of a release agent.

In contrast to known molds, the glass cover 100 with the finished foam cladding 120 can be removed from the mold 200 according to the invention after the plastic material has cured without the need for a sprue 130 on the foam cladding 120 having to still be removed. Costly, manual reworking is thus completely eliminated, and the risk of irreparably damaging the foam cladding 120 during manual reworking is completely eliminated.

By virtue of the invention, the dimensioning of the sprue in the tool can be made smaller. For instance, the length/thickness ratio can therefore also be changed from what was previously 100 mm length×1 mm thickness (i.e., 100 $mm^2$ cross section) to 50 mm length×2 mm thickness (i.e., 100 $mm^2$ cross section). This means better filling of the mold from the center, less turbulence in the material, and thus fewer sources of error in the foaming process. The parting lines are then only visible in an area of 50 mm and not over a length of 100 mm as before.

The invention makes it possible to avoid an increase in pressure in the tool, which normally occurs when the cleaning piston pushes the residual plastic material out of the mixing head outlet pipe after the cavity has been completely filled. This residual material—in the case, of a plastic frame of a foam-clad glass cover of a sunroof, it is only about 8 grams—is often the reason that the plastic material is pressed past a seal, that sheet metal tabs inserted there, for example, are foamed over on the front side, that the glass corners are often foamed over during the foam-cladding of a glass cover, or that foam inserts collapse.

The invention effectively prevents surface defects from forming in the form of slight waves or sink marks, since the plastic, which is still liquid, is first compressed and, so to speak, flows away by gravity until it hardens.

The invention also enables slides to be saved, since no sprue is allowed in the visible area. In this case, the sprue is not located on the outer edge of the component, but rather somewhere in the geometry. This also results in a better quality of the finished component, since visible parting lines on the component are avoided.

Finally, the invention also offers a significant economic advantage through substantial time-savings: Cutting and grinding the radius on the contour, which takes about 10 seconds, is omitted by virtue of the invention. In the case of a three-shift operation, this results in approximately 5300 parts that can be additionally manufactured per year.

The present invention works not only in a tool for producing plastic frames on glass lids, but for all components that are produced with such a mixing head system from at least two-component plastics in the same or a similar manner in a mold. Therefore, suitable materials for the plastic frame or the plastic component include not only polyurethane (PU), but also other materials such as epoxy resins using a resin injection process (RTM or resin transfer molding), or with other plastics or using other processes.

In the figures, the mold 200 is shown as a lower mold on which the mixing head 300 and the sprue channel 210 are provided. This lower mold is supplemented by an upper mold, which is not shown in the figures but is shown in the application DE 10 2019 112 763.7 by the same applicant, for example, and on which the mixing head 300 and the sprue channel 210 can also be alternatively provided.

LIST OF REFERENCE SYMBOLS

100 (plate-shaped) component (glass cover)
120 foam cladding
130 sprue
200 mold
210 sprue channel
220 cavity (for sprue)
225 feed channel
230 gap
240 cavity (for 120)
300 mixing head
310 plate
320 mixing channel
330 injection channel (component 1)
340 injection channel (component 2)
350 cleaning channel
355 cleaning cylinder
360 cleaning plunger
365 cleaning piston
370 main line
380 (hydraulic) delay element
400 sprue cutter
410 slide
412 contour
414 front edge
416 seal
420 holder (on 410)
430 (vertical) guide groove
440 guide element (T-nut)
450 actuating cylinder (horizontal)
452 guide rod
454 piston
460 branch line
470 actuating cylinder (vertical)
472 piston
474 connection
480 pivot axis
490 bracket

The invention claimed is:

1. A mold for producing a foam cladding made of plastic on a planar component or for producing a foamed plastic part, comprising a mixing head for producing liquid plastic from at least two components, at least one first cavity for receiving the plastic in order to form the foam cladding or to produce the foamed plastic part, a sprue channel for connecting the mixing head to the at least one first cavity, and a further cavity, which is formed at the transition of the sprue channel to the first cavity and widens the sprue channel, wherein a sprue cutter having at least one slide is movably mounted on the mold, which slide can be moved by means of at least one actuating cylinder in the direction of the sprue channel toward the first cavity and, in an end position of the movement of the slide, closes off the first cavity from the sprue channel and from the further cavity by means of at least one edge and/or contour, wherein when the slide is in its end position, a gap for receiving superfluous plastic material is unblocked between the slide and the mixing head in the vicinity of the sprue channel.

2. The mold according to claim 1, wherein the actuating cylinder is hydraulically connected by means of a branch line to a main line of a cleaning cylinder, which is used to actuate a cleaning piston in order to clean the mixing head.

3. The mold according to claim 2, wherein the actuating cylinder and the cleaning piston can only be actuated when the first cavity is completely filled.

4. The mold according to claim 1, wherein the slide is connected to the actuating cylinder by means of a guide element that is displaceably mounted in a vertical guide groove.

5. The mold according to claim 4, wherein the slide can be moved vertically by means of at least one further actuating cylinder by means of the guide groove that is arranged on the guide element.

6. The mold according to claim 1, wherein the slide has, on its front edge facing toward the first cavity, a contour that is adapted to the contour of the foam cladding.

7. The mold according to claim 1, wherein the slide is provided with at least one seal which surrounds the sprue channel at least partially and the further cavity at a distance.

8. The mold according to claim 2, wherein an additional valve or a hydraulic delay element is provided in the main line of the cleaning cylinder after the branch line that brings about a time delay between the hydraulic impingement of the actuating cylinder and the hydraulic impingement of the cleaning cylinder.

9. The mold according to claim 1, wherein the sprue cutter is mounted on the mold so as to be swivelable about a pivot axis.

10. The mold according to claim 9, wherein the swiveling of the sprue cutter about the pivot axis occurs only after the slide has moved into its end position in order to close off the first cavity from the sprue channel and/or from the further cavity.

11. The mold according to claim 2, wherein the slide is connected to the actuating cylinder by means of a guide element that is displaceably mounted in a vertical guide groove.

12. The mold according to claim 3, wherein the slide is connected to the actuating cylinder by means of a guide element that is displaceably mounted in a vertical guide groove.

* * * * *